United States Patent [19]
Cogger et al.

[11] Patent Number: 6,032,184
[45] Date of Patent: Feb. 29, 2000

[54] INTEGRATED INTERFACE FOR WEB BASED CUSTOMER CARE AND TROUBLE MANAGEMENT

[75] Inventors: Timothy John Cogger, Chapel Hill; Isaac A. Kunkel, III, Apex; David Todd Miller, Fuquay-Varina; Suma P. Patil, Apex, all of N.C.

[73] Assignee: MCI WorldCom, Inc., Jackson, Miss.

[21] Appl. No.: 09/159,701

[22] Filed: Sep. 24, 1998

Related U.S. Application Data

[63] Continuation-in-part of application No. 08/581,728, Dec. 29, 1995, abandoned.

[60] Provisional application No. 60/060,655, Sep. 26, 1997.

[51] Int. Cl.[7] .................................................. G06F 17/60
[52] U.S. Cl. ................................. 709/223; 705/8; 707/10
[58] Field of Search ........................ 705/1, 8, 9; 709/203, 709/204, 223, 224; 707/10, 104

[56] References Cited

U.S. PATENT DOCUMENTS

| | | |
|---|---|---|
| 4,893,248 | 1/1990 | Pitts et al. . |
| 5,131,020 | 7/1992 | Liebesny et al. . |
| 5,287,270 | 2/1994 | Hardy et al. . |
| 5,325,290 | 6/1994 | Cauffman et al. . |
| 5,452,446 | 9/1995 | Johnson . |
| 5,475,836 | 12/1995 | Harris et al. . |
| 5,483,596 | 1/1996 | Rosenow et al. . |
| 5,491,779 | 2/1996 | Bezjian . |
| 5,530,744 | 6/1996 | Charalambous et al. . |
| 5,548,726 | 8/1996 | Pettus . |
| 5,563,805 | 10/1996 | Arbuckle et al. ........................ 709/204 |
| 5,602,918 | 2/1997 | Chen et al. . |
| 5,621,727 | 4/1997 | Vaudreuil . |
| 5,623,601 | 4/1997 | Vu . |
| 5,649,182 | 7/1997 | Reitz . |
| 5,666,481 | 9/1997 | Lewis . |
| 5,671,354 | 9/1997 | Ito et al. . |
| 5,689,645 | 11/1997 | Schettler et al. . |
| 5,692,030 | 11/1997 | Teglovic et al. . |
| 5,696,906 | 12/1997 | Peters et al. . |
| 5,699,403 | 12/1997 | Ronnen . |
| 5,706,502 | 1/1998 | Foley et al. . |
| 5,708,780 | 1/1998 | Levergood et al. . |

(List continued on next page.)

FOREIGN PATENT DOCUMENTS

WO 97/16911  5/1997  WIPO .

OTHER PUBLICATIONS

MCI Communications Corp.'s "Direct Dispatch Interactive Software Package", InforWorld, v16, n2, p5(1), Jan. 1994.
Burch, Bill "AT&T, MCI to release new management tools", Network World, v11n3 pp: 19, Jan. 1994.
*Computer Networks*, Andrew S. Tanenbaum, pp. 410–412.
"XII6.3 (Broadway) Overview", http://www.x.org/broadway.htm.
"Stac Unveils Windows NT 4.0 and Web Browser Support in New ReachOut 7" http://www.stac.com/news/pressrel/pro7_unveil.html.

*Primary Examiner*—Allen R. MacDonald
*Assistant Examiner*—Hani M. Kazimi

[57] ABSTRACT

A system and method for opening and tracking trouble tickets over the public Internet. A customer service management system provides information included within a customer profile record to a Web enabled infrastructure which is accessible by a remote customer workstation having a Web browser and Internet access. The customer profile information is used to prepopulate data fields in dialogs used to open a trouble ticket. Once a trouble ticket is opened, the customer workstation tracks the existing trouble tickets through a browser based graphical user interface. The graphical user interface provides current and historical status reports of the actions taken to resolve a network event and the service organizations responsible for resolving the network event.

20 Claims, 16 Drawing Sheets

U.S. PATENT DOCUMENTS

| | | |
|---|---|---|
| 5,721,908 | 2/1998 | Lagarde et al. . |
| 5,721,913 | 2/1998 | Ackroff et al. . |
| 5,727,129 | 3/1998 | Barrett et al. . |
| 5,734,709 | 3/1998 | DeWitt et al. . |
| 5,734,831 | 3/1998 | Sanders . |
| 5,742,762 | 4/1998 | Scholl et al. . |
| 5,742,768 | 4/1998 | Gennaro et al. . |
| 5,742,905 | 4/1998 | Pepe et al. . |
| 5,745,754 | 4/1998 | Lagarde et al. . |
| 5,754,830 | 5/1998 | Butts et al. . |
| 5,764,756 | 6/1998 | Onweller . |
| 5,768,501 | 6/1998 | Lewis . |
| 5,774,660 | 6/1998 | Brendel et al. . |
| 5,778,178 | 7/1998 | Arunachalam . |
| 5,781,550 | 7/1998 | Templin et al. . |
| 5,781,632 | 7/1998 | Odom . |
| 5,787,160 | 7/1998 | Chaney et al. . |
| 5,790,780 | 8/1998 | Brichta et al. . |
| 5,790,789 | 8/1996 | Suarez . |
| 5,790,797 | 8/1998 | Shimada et al. . |
| 5,793,694 | 8/1998 | Rogers et al. . |
| 5,793,762 | 8/1998 | Penners et al. . |
| 5,793,964 | 8/1998 | Rogers et al. . |
| 5,796,393 | 8/1998 | MacNaughton et al. . |
| 5,799,154 | 8/1998 | Kuriyan . |
| 5,802,320 | 9/1998 | Baehr et al. . |
| 5,805,803 | 9/1998 | Birrell et al. . |
| 5,812,654 | 9/1998 | Anderson et al. . |
| 5,815,080 | 9/1998 | Taguchi . |
| 5,815,665 | 9/1998 | Teper et al. . |
| 5,819,225 | 10/1998 | Eastwood et al. . |
| 5,819,271 | 10/1998 | Mahoney et al. . |
| 5,826,029 | 10/1998 | Gore, Jr. et al. . |
| 5,826,269 | 10/1998 | Hussey . |
| 5,835,084 | 11/1998 | Bailey et al. . |
| 5,844,896 | 12/1998 | Marks et al. . |
| 5,845,067 | 12/1998 | Porter et al. . |
| 5,845,267 | 12/1998 | Ronen . |
| 5,850,517 | 12/1998 | Verkler et al. . |
| 5,852,810 | 12/1998 | Sotiroff et al. . |
| 5,852,812 | 12/1998 | Reeder . |
| 5,877,759 | 3/1999 | Bauer ........................................ 345/339 |
| 5,909,679 | 6/1999 | Hall .............................................. 707/4 |

Customer Details

| | Name | Phone | | OK |
|---|---|---|---|---|
| Reported By: | GARY HENKEL | 719-111-2222 | | Cancel |
| Primary: | BUGS BUNNY | 719-222-3333 | | Help |
| Secondary: | | | | |

| Cust Name: | JCP | Cust Group ID: | |
|---|---|---|---|
| Ref in Ticket: | | Report Source: | CUS |
| GMT Access: | 24 HR | GMT Test Time: | |

Circuit Details

- Circuit No: MCI APPLICATI
- End Ckt Seq:
- Installed Date:
- Line Speed:
- MCI Product Code: VNET
- MCI Service Code: VCM
- Telco Ckt 1:
- Telco Ckt 2:
- TUSA Ckt 1:
- TUSA Ckt 2:

- Cntl Term:
- Dist Term:
- Orig Switch:
- Orig Trunk:
- Orig CLLI:
- Term Switch:
- Term Trunk:
- Term CLLI:
- Data Line Y/N:
- Multi Point:

[OK] [Cancel] [Help]

| Ticket Number | Org | Status Code | Status Date | Status Time | Cust Pri | MCI Pri | Identifier | Trouble Code |
|---|---|---|---|---|---|---|---|---|
| 9312130000022 | JCA | OPN | 12/13/1993 | 22:12 | 4 | 3 | A999999991111 | 312 |
| 9312130000021 | ENA | OPN | 11/30/1993 | 21:46 | 3 | 2 | 202-555-5555 | 396 |
| 9312130000018 | ENA | OPN | 11/30/1993 | 21:46 | 4 | 3 | A999999991111 | 106 |
| 9312130000011 | JCA | OPN | 12/13/1993 | 17:52 | 4 | 2 | A999999991111 | 101 |
| 9312130000006 | JCP | OPN | 12/13/1993 | 17:45 | 3 | 2 | A999999991111 | 101 |
| 9312130000001 | ENA | OPN | 12/02/1993 | 16:37 | 4 | 2 | A999999991111 | 501 |
| 9311300000002 | ENA | OPN | 11/30/1993 | 21:46 | 4 | 1 | A999999991111 | 501 |
| 9311290000002 | ENA | OPN | 11/29/1993 | 20:59 | 2 | 1 | A999999991111 | 101 |
| 9311290000001 | ENA | OPN | 11/29/1993 | 19:32 | 4 | 1 | A999999991111 | 101 |
| 9311240000002 | ENA | OPN | 11/24/1993 | 17:56 | 2 | 1 |  | 101 |
| 9311230000007 | ENA | OPN | 11/23/1993 | 23:03 | 3 | 1 | A999999991111 | 101 |
| 9311230000004 | ENA | OPN | 11/23/1993 | 22:21 | 4 | 1 | A999999991111 | 101 |
| 9311220000004 | ENA | OPN | 11/22/1993 | 20:54 | 3 | 3 | A999999991111 | 101 |
| 9311180000013 | ENA | OPN | 11/18/1993 | 20:52 | 4 | 2 | A999999991111 | 301 |
| 9311180000004 | ENA | OPN | 11/18/1993 | 17:57 | 4 | 1 | A999999991111 | 101 |
| 9408160000008 | JCA | REF | 08/16/1994 | 17:30 | 2 | 1 | A999999991111 | 501 |

MCI Direct Dispatch - version 1.27 08/22/95 - [Ticket List]

Ticket Number: 9312130000022

Please close or refer back all tickets with ORN status

FIG. 11

Activities List

Ticket Number: 9312130000022

| Activity Code | From  | To    | UserID | Date     | Time  | Clear Code |
|---------------|-------|-------|--------|----------|-------|------------|
| OPN           | 1 JCA | 1 JCA | COJXLB | 12/13/93 | 21:10 |            |
| R O           | 1 JCA | 1 ENA | COJXLB | 12/13/93 | 22:09 |            |
| R O           | 1 ENA | 1 TMD | COJXLB | 12/13/93 | 22:11 |            |
| ESC           | 1 ENA | 1 TMD | COJXLB | 12/13/93 | 22:12 |            |
| R B           | 1 TMD | 1 ENA | COJXLB | 12/13/93 | 22:12 | 106        |
| R B           | 1 ENA | 1 JCA | COJXLB | 12/13/93 | 22:12 | 106        |

Exit

Detail

Help

Ticket Details

- Ticket No: 9312130000022
- Product: MCI APPLICATIONS
- Service: VNET CM
- Trouble Desc: CAN'T XMIT DATA
- MCI Priority: 9
- Time Zone: GMT
- Occurred Date: 8/16/94
- Occurred Time: 12:11
- Organization: JCP
- Identifier: MCI APPLICATIONS
- Cust Priority: 401

Exit
Remarks... *1202*
Activities... *1204*
Modify...
Help

Detail Views
- Customer...
- Circuit...
- Call...

006 # INTEGRATED INTERFACE FOR WEB BASED CUSTOMER CARE AND TROUBLE MANAGEMENT

CROSS-REFERENCE TO RELATED APPLICATIONS

This application is a continuation-in-part of U.S. Ser. No. 08/581,728 filed Dec. 29, 1995, now abandoned entitled DIRECT DISPATCH, and claims the benefit of U.S. Provisional patent application U.S. Ser. No. 60/060,655, filed Sep. 26, 1997, entitled INTEGRATED CUSTOMER INTERFACE SYSTEM FOR COMMUNICATIONS MANAGEMENT.

FIELD OF THE INVENTION

The present invention relates generally to an Internet enabled communications network fault management tool, and more specifically is directed toward a system and method for interactive trouble reporting and monitoring.

BACKGROUND OF THE INVENTION

To insure a high availability rate in communications network services provided to customers, service providers require accurate and responsive maintenance efforts. The network management services that support these maintenance efforts are a vital part of a service provider's marketability.

In conventional customer enabled maintenance systems, a connection is made with a large legacy system via a dial-up connection from a customer owned personal computer or work station. This connection frequently, although not always, emulates a terminal addressable by the legacy system. The dial-up access requires custom software on the customer workstation to provide dial-up services, communication services, emulation and/or translation services and generally some resident custom form of the legacy application to interface with the mid-range or mainframe computer running the legacy system.

There are several problems associated with this approach:

First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Secondly, dial-up, modem, and communications software interact with each other in many ways which are not always predictable to a custom application, requiring extensive trouble shooting and problem solving for an enterprise wishing to make the legacy system available to the customer, particularly where various telephone exchanges, dialing standards or signal standards are involved.

Third, when an enterprise wishes to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBCDIC language used by IBM, and the 127 character ASCII language used by contemporary personal computers.

Finally, the security and entitlement features of the various legacy systems may be completely different, and vary from system to system and platform to platform.

It is therefore desired to provide connectivity to enterprise legacy systems over the public Internet, as the Internet provides access connectivity world wide via the TCP/IP protocol, without need to navigate various telephone exchanges, dialing standards or signal standards.

One such type of legacy system for the telecommunications industry is known as a fault management system which can provide a range of services to larger customers of the enterprise. A subset program within the fault management tools has been known to the public as "trouble tickets", the tool which allows a "trouble ticket" to be opened in response to a telecommunications network fault or a service problem.

In conventional dial-up trouble systems, service providers utilize trouble ticketing as a means for identifying reported network problems, failures, or customer inquiries. When a network problem, failure, or customer inquiry is reported, a trouble ticket describing the network problem, failure, or customer inquiry is opened. Generically, the trouble ticket is an electronic tracking mechanism that may exist as a data record in a database. In this example, the data record includes information describing the failure event, time of occurrence, etc.

In operation, the status of the trouble ticket is considered open as long as the network condition remains unresolved. At any given time, the collection of open trouble tickets represents the set of ongoing and future repair efforts of the service provider. This mechanism provides the service provider with a convenient method for identifying the status of current and future repair efforts.

Customers also desire access to this information. Generally, a customer's assessment of a particular network management service is not based solely upon the time frame of repair for the current network failure. In other words, the customer does not want to report a network problem, failure, or customer inquiry and passively wait for resolution. Customers desire information on the status of open trouble tickets.

Thus, what is needed is a system and method for allowing a customer to remotely access a service provider's trouble ticketing system. This remote access must enable a customer to seamlessly open a trouble ticket and identify the status of all trouble tickets pertaining to his organization.

Customers further desire an open access route to this information. The rapid adoption and use of the Internet for data exchange has also prompted a desire on the part of customers to access their data over the Internet.

The present invention is one component of an integrated suite of customer network management and report applications using the Internet and a World Wide Web ("WWW" or "Web") browser paradigm. Introduced to the communications industry as "networkMCI Interact" the integrated suite of Web-based applications provides an invaluable tool for enabling customers of a telecommunications enterprise to manage their telecommunication assets, quickly and securely, from anywhere in the world.

The popularity of the public Internet provides a measure of platform independence for the customer, as the customer can run their own Internet Web-browser and utilize their own platform connection to the Internet to enable service. This resolves many of the platform hardware and connectivity issues in the customers favor, and lets the customer choose their own platform and operating system. Web-based programs can minimize the need for training and support since they utilize existing client software which the user has already installed and already knows how to use, i.e., the browser. Further, if the customer later changes that platform, then, as soon as the new platform is Internet enabled, service is restored to the customer. The connectivity and communications software burden is thus resolved in favor of standard and readily available hardware and software used to obtain a public Internet connection.

An Internet delivered paradigm obviates many of the installation and configuration problems involved with initial setup and configuration of a customer workstation, since the custom application required to interface with the legacy system can be delivered via the public Internet and run within a standard Web-browser, reducing application compatibility issues to browser compatibility issues.

For the enterprise, the use of off-the-shelf Web browsers by the customer significantly simplifies the enterprise burden by limiting the client development side to screen layouts and data presentation tools that use a common interface enabled by the Web browser. Software development and support resources are thus available for the delivery of the enterprise legacy services and are not consumed by a need for customer support at the work station level.

SUMMARY OF THE INVENTION

The present invention satisfies the above mentioned needs by providing an Internet enabled and Web-based remote interface that allows a customer to open and monitor trouble tickets relating to network events and service problems on the enterprise network.

To generate a trouble ticket from a user's remote customer workstation, a user first logs on to the Internet through any Internet access route, and then logs on to the enterprise Web-server. After verification of the customer's entitlements to use the system, the Web-server downloads an available suite of services for that customer, which may include the trouble ticket tool, which is offered by the assignee of the present invention as the "Service Inquiry" service. This service is provided to the customer through a service object that is invoked and maintained by a browser based backplane, and which calls, as needed, other objects, including objects to enable graphical displays of data to the customer. From the opening screen, the customer may select the opportunity to open a new trouble ticket, and the Web-server will then download the service program object which will enable opening and generation of a trouble ticket.

At the time of customer verification, the enterprise Customer Service Management System ("CSM") has obtained certain information relating to a customer profile maintained on an administrative server that provides authentication services for the present invention. This customer profile information may automatically prepopulate at least one field in a dialog involved in the opening of a trouble ticket. In this prepopulation process, data contained within the customer profile may be automatically entered into a field of a particular dialog. Through this prepopulation, the amount of required user input is minimized, thereby increasing customer usability. Additionally, the input efficiency provided by prepopulation allows the service organization to begin the trouble resolution process with minimal delay.

Upon downloading of the prepopulated trouble report from the Web-server, the customer then enters information into a problem classification dialog. The problem classification dialog describes the type of network problem, failure, or customer inquiry (e.g., circuit or 800 number). After this problem classification dialog is completed, the user is prompted with questions that pertain to the network problem, failure, or customer inquiry described in the problem classification dialog. Both the questions and the corresponding answers may be entered into the remarks section of the trouble ticket. The remarks section of the trouble ticket provides a historical record of the commentary that is provided by either the user or a service organization that has been assigned the trouble ticket.

Finally, the trouble ticket is submitted to the Customer Service Management System. When the CSM accepts the trouble ticket, a trouble ticket number is assigned. Thereafter, the trouble ticket maybe displayed in a browser based frame through an object based graphical user interface that permits monitoring of all existing trouble tickets.

According to one embodiment, the graphical user interface object may display a scrollable table that includes a plurality of rows, wherein each of the plurality of rows include trouble ticket descriptive information for at least one trouble ticket. Each of the rows further comprises an activity code field indicating the status of a trouble ticket (e.g., open, referred out, or closed) and an organization field indicating what customer or service organization that currently has authority over the trouble ticket. In combination, the activity code field and the organization field provide the user with a current status report of the trouble ticket's flow through the service organization network.

Additionally, the Service Inquiry object also allows the user to access an activities list that displays all actions and referrals for that trouble ticket. This chronological display provides a historical record of the activities taken by any organization within the service organization network. Finally, the graphical user interface allows the user to access the remarks section that displays all comments associated with the trouble ticket.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

FIGS. 6–10 illustrate various graphical user interfaces that may be presented to a customer for opening a trouble ticket.

FIG. 11 illustrates a representative graphical user interface for tracking trouble tickets.

FIGS. 13 and 15 illustrate representative graphical user interfaces for identifying the details of a trouble ticket.

FIG. 14 illustrates a representative graphical user interface for filtering and sorting trouble tickets.

DETAILED DESCRIPTION OF THE PREFERRED EMBODIMENTS

The popularity and wide spread adoption of the public Internet provides a measure of platform independence for customers who wish to connect to an enterprise system, as the customer can run their own Internet Web-browser and utilize their own platform connection to the Internet to enable service. This resolves many of the platform hardware and connectivity issues in the customers favor, and lets the customer choose their own workstation platform and operating system. Web-based programs can minimize the need for training and support since they utilize existing customer browser software which the user has already installed and already knows how to use. Any issues relating to connectivity and communications have already been resolved in favor of standard and readily available hardware and the browser and dialup software used by the public Internet connection.

An Internet delivered paradigm for customer services obviates many of the installation and configuration problems involved with initial setup and configuration of a dial-up customer workstation, since the custom application required to interface with the legacy system can be delivered via the public Internet and run within a standard Web-browser, reducing application compatibility issues to browser compatibility issues.

Architectural Overview of the Web-Enabled System

The Web-enabled system in which the present "Service Inquiry" invention is found is basically organized as a set of common components which together are known as networkMCI Interact, which includes the following major components:

1) a software architecture detailing the client and server based aspects of networkMCI Interact;

2) a network architecture defining the physical network needed to satisfy the security and data volume requirements of networkMCI Interact;

3) a data architecture detailing the application, back-end or legacy data sources available for networkMCI Interact; and, 4) an infrastructure covering security, order entry, fulfillment, billing, self-monitoring, metrics and support.

Each of these common component areas will be generally discussed hereinbelow. More detailed descriptions of each of these components can be found in a series of related, co-pending U.S. patent applications summarized in INTEGRATED CUSTOMER INTERFACE SYSTEM FOR COMMUNICATIONS NETWORK MANAGEMENT, (Attorney Docket 11038), filed on even date, the disclosure and contents of which are incorporated herein by reference thereto.

Figure 1:
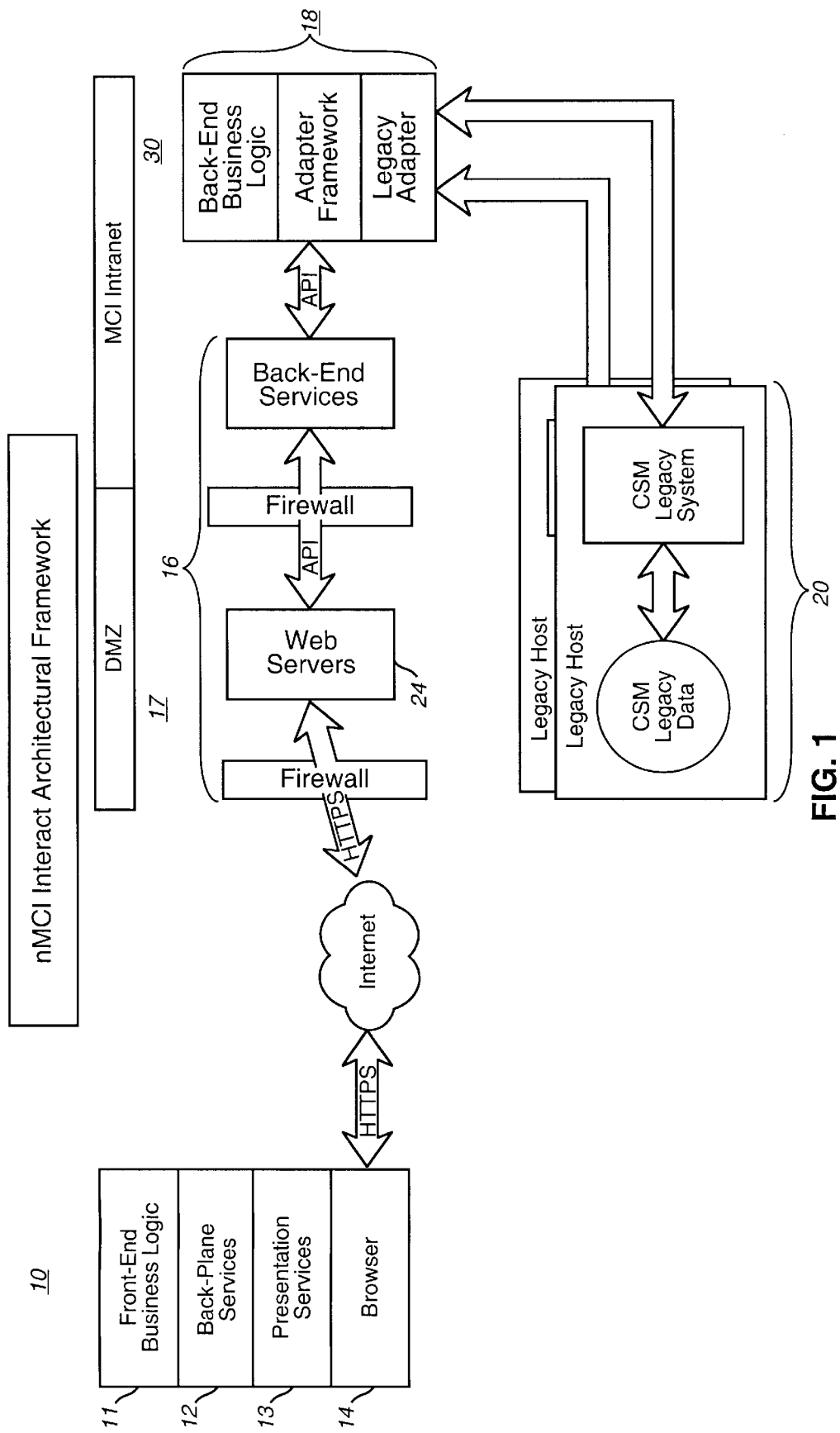
FIG. 1 is a diagrammatic overview of the architectural framework of an enterprise Internet network system.

FIG. 1 is a diagrammatic illustration of the software architecture in which the present invention functions. A first tier of software services are resident on a customer work station 10 and provides customer access to the enterprise system, having one or more downloadable application objects 11 directed to front end business logic and application services, one or more backplane services objects 12 for managing sessions, one or more presentation services objects 13 for the presentation of customer options and customer requested data in a browser recognizable format and a customer supplied browser 14 for presentation of customer options and data to the customer and for Internet communications over the public Internet.

A second or middle tier 16 is provided, having secure Web servers 24 and back end services to provide applications that establish user sessions, govern user authentication and their entitlements, and communicate with adaptor programs to simplify the interchange of data across the network.

A back end or third tier 18 having applications directed to legacy back end services includes database storage and retrieval systems and one or more database servers for accessing system resources from one or more legacy systems 20.

Generally, as explained in co-pending U.S. patent application GRAPHICAL USER INTERFACE FOR WEB ENABLED APPLICATIONS, U.S. Ser. No. 09/159,515 filed Sep. 24, 1998 (Attorney Docket 11040), the customer or client tier or workstation 10 is client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, Service Inquiry, Toll Free Network Manager or Call Manager functions. The system is capable of delivering to customers the functionality appropriate to their product mix.

Figure 4:
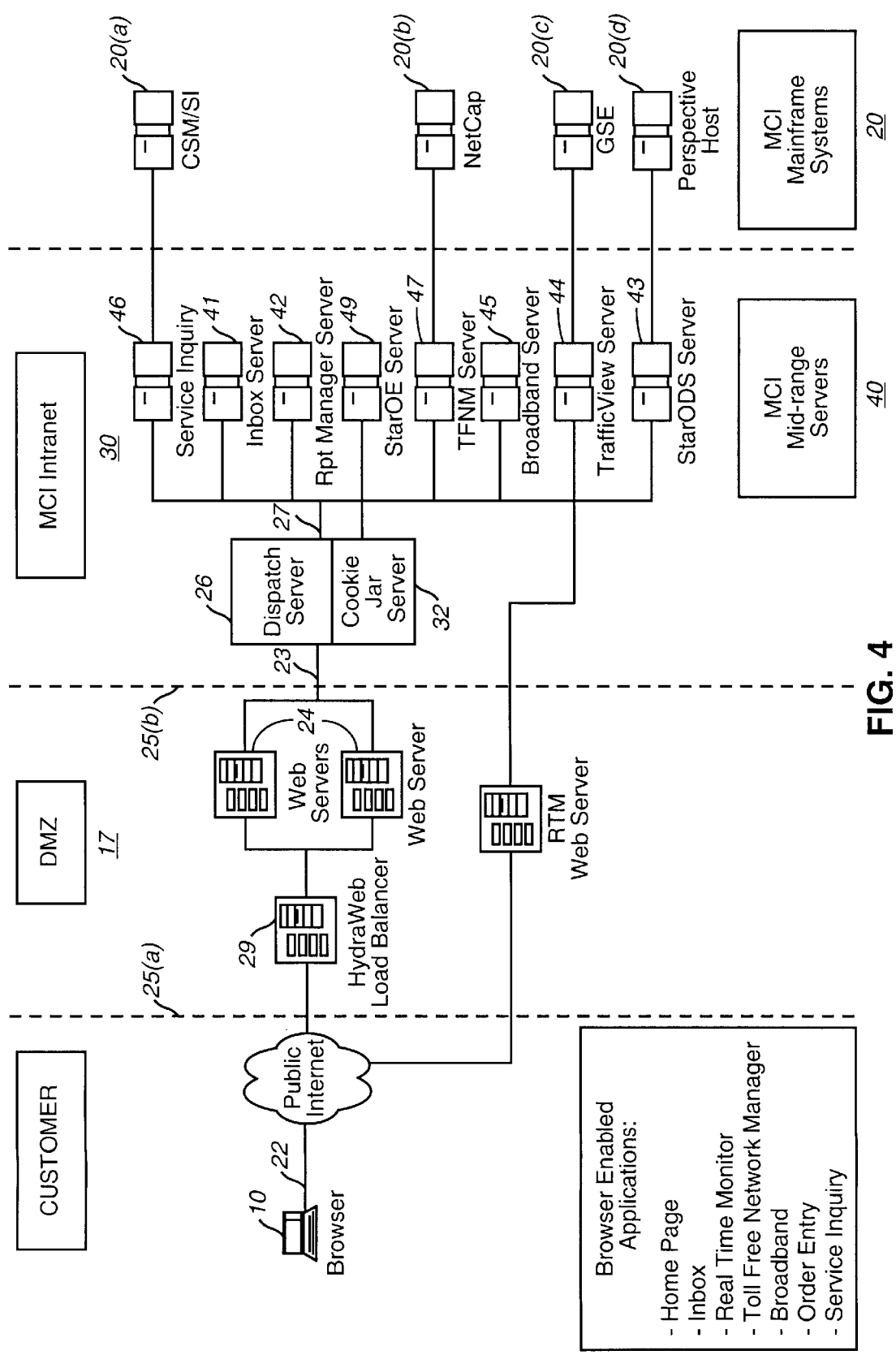
FIG. 4 is a diagrammatic representation of the network architecture of the Internet network system used to provide the services of the present invention.

FIG. 4 is a diagrammatic illustration of the network and platform components of the networkMCI Interact system, including: the Customer workstation 10; the Demilitarized Zone 17 (DMZ); Web Servers cluster 24; the MCI Intranet Dispatcher/Proxy Servers cluster 30; and the MCI Intranet Application servers 40, warehouses, legacy systems, etc.

The customer workstation 10 is browser enabled and includes client applications responsible for presentation and front-end services. Its functions include providing a user interface to various MCI services and supporting communications with MCI's Intranet Web server cluster 24.

Figure 2A:
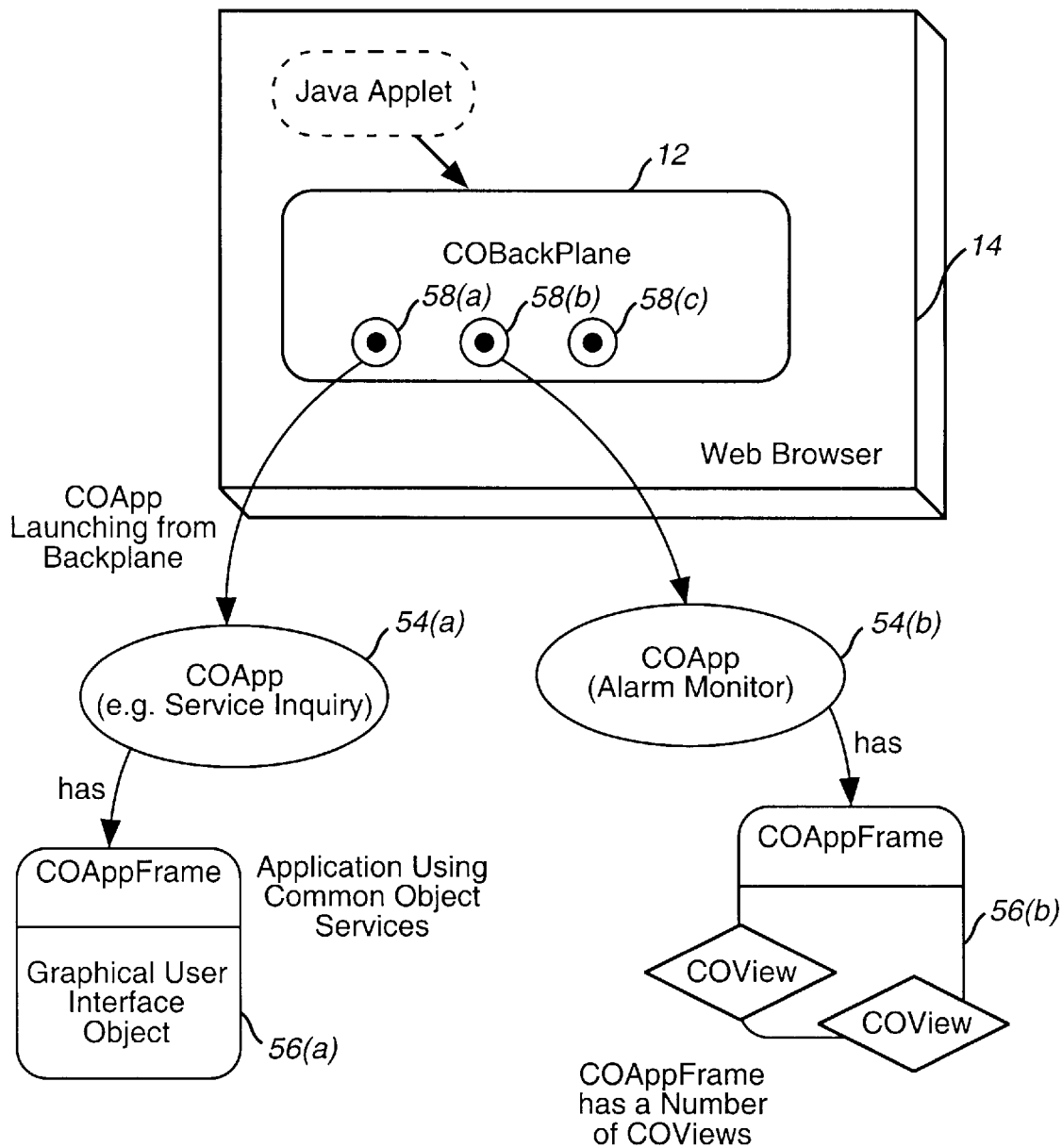
FIG. 2(a) is a diagrammatic illustration of the backplane management of the Web-browser at the customer workstation as contemplated by the present invention.

As illustrated in FIG. 2(a), and more specifically described in the above-referenced co-pending U.S. patent application Ser. No. 09/159,515, filed Sep. 24, 1998 (Attorney Docket 11040), the contents of which are incorporated by reference as if fully set forth herein, the client tier software is responsible for presentation services to the customer and generally includes a Web browser 14 and additional object-oriented programs residing in the client workstation platform 10. The client software is generally organized into a component architecture with each component generally comprising a specific application, providing an area of functionality. The applications generally are integrated using a "backplane" services layer 12 which provides a set of services to the application objects which provide the front end business logic 11 and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

Figure 3:
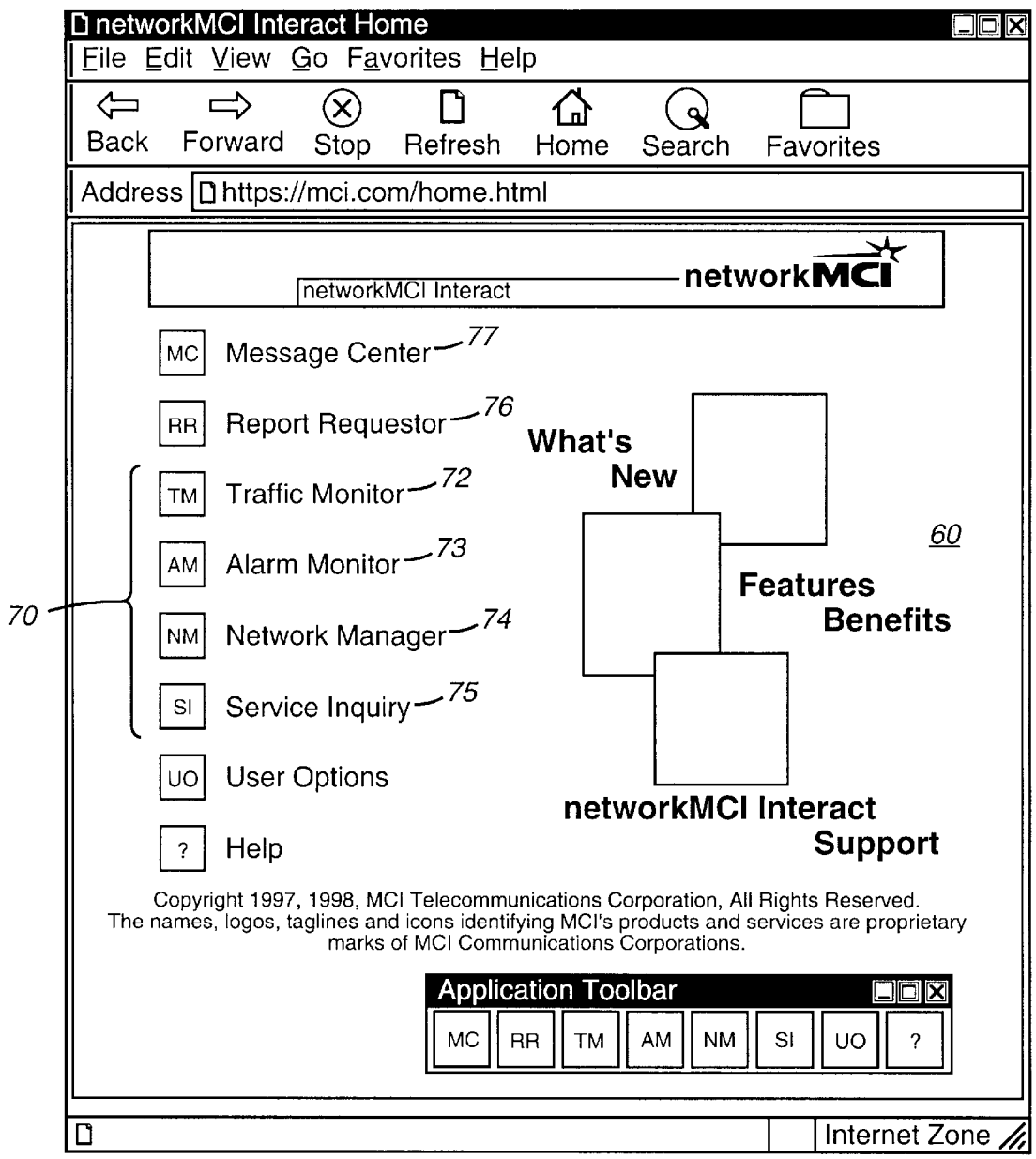
FIG. 3 is a typical new home-page presented to a customer at logon, prior to invoking the service inquiry and trouble ticket objects.

FIG. 2(a) is an diagrammatic example of a backplane architecture scheme illustrating the relationship among the common objects. In this example, the backplane services layer 12 is programmed as a Java applet which can be loaded and launched by the Web browser 14. With reference to FIG. 2(a), a typical user session starts with a Web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 2(a) as buttons 58a,b,c selectable by the user. As illustrated in FIG. 2(a), upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 2(a) shows graphical user interface objects 56a,b created and used by a respective application 54a,b for its own presentation purposes. FIG. 3 illustrates an example client GUI presented to the client/customer as a browser Web page 60 providing, for example, a suite 70 of network management reporting applications including: MCI Traffic Monitor application 72; an alarm monitor application 73; a Network Manager application 74 and the Service Inquiry application 75. Access to network functionality is also provided through Report Requester 76, which provides a variety of detailed reports for the client/customer and a Message Center 77 for providing enhancements and functionality to traditional e-mail communications.

Briefly, when the client application on the customer's workstation needs to communicate with one of the Intranet application servers 40 it will use an instance of one of the objects from a client communications package installed in the client platform. When the data is to be communicated, the objects will format the data, and particularly, encrypt it, for example, by using browser to Web server negotiated SSL. As shown in FIG. 4, the objects will then communicate the data by establishing a secure TCP messaging session with one of the DMZ networkMCI Interact Web servers 24 via an Internet secure communications path 22 established, preferably, in accordance with a secure sockets layer ("SSL") protocol, such as HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request and forward it over a second secure socket connection 23 to the dispatch server 26 inside the enterprise Intranet.

As described in greater detail in the co-pending U.S. patent application AUTHENTICATION AND ENTITLEMENTS FOR USERS OF WEB BASED DATA MANAGEMENT PROGRAMS, U.S. Ser. No. 09/159,408, filed Sep. 24, 1998 (Attorney Docket 11042), the disclosure of which is incorporated herein by reference thereto, a networkMCI Interact session is designated by a logon, successful authentication, followed by use of server resources, and logoff. As world-wide Web communications use HTTP, a stateless protocol, each HTTP request and reply is a separate TCP/IP connection, completely independent of all previous or future connections between the same server and client. Associating a given HTTP request with the logical session to which it belongs requires a "cookie jar server" 32 to generate a "cookie" which is a unique server-generated key that is sent to the client along with each reply to a HTTPS request. The client holds the cookie and returns it to the server as part of each subsequent HTTPS request. As desired, either the Web servers 24, the cookie server or the Dispatch Server 26, may maintain the "cookie jar" to map these keys to the associated session. A separate cookie jar server 32, as illustrated in FIG. 4 has been found desirable to minimize the load on the dispatch server 26. A new cookie will be generated when the response to the HTTPS request is sent to the client. This form of session management also functions as an authentication of each HTTPS request, adding security to the overall process.

As illustrated in FIG. 4, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requestor is authorized to communicate with the target service, the message is forwarded to the desired service's proxy. Each application proxy is an application specific daemon which resides on a specific Intranet server, shown in FIG. 4 as a suite of mid-range servers 40. Each Intranet application server of suite 40(a) is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 4 may also include a variety of application specific proxies having associated Intranet application servers including: a StarOE proxy for the StarOE application server 49 for handling authentication order entry/billing; an Inbox proxy for the Inbox application server 41, which functions as a container for completed reports, call detail data and marketing news messages, a Report Manager Proxy capable of communicating with a system-specific Report Manager server 42 for generating, managing and scheduling the transmission of customized reports including, for example: call usage analysis information provided from the StarODS server 43; network traffic analysis/monitor information provided from the Traffic view server 44; virtual data network alarms and performance reports provided by Broadband server 45; trouble tickets for switching, transmission and traffic faults provided by Service Inquiry server 46; and toll free routing information provided by Toll Free Network Manager server 47.

As partially shown in FIG. 4, it is understood that each Intranet server of suite 40 communicates with one or several consolidated network databases which include each customer's network management information and data. In the present invention the Services Inquiry server 46 includes communication with MCI's Customer Service Management legacy platform 20(*a*). Such network management and customer network data is additionally accessible by authorized MCI management personnel. As shown in FIG. 4, other legacy platforms 20(*b*), 20(*c*) and 20(*d*) may also communicate individually with the Intranet servers for servicing specific transactions initiated at the client browser. The illustrated legacy platforms 20(*a*)–(*d*) are illustrative only and it is understood other legacy platforms may be interpreted into the network architecture illustrated in FIG. 4 through an intermediate midrange server 40.

Each of the individual proxies may be maintained on the dispatch server 26, the related application server, or a separate proxy server situated between the dispatch server 26 and the midrange server 40. The relevant proxy waits for requests from an application client running on the customer's workstation 10 and then services the request, either by handling them internally or forwarding them to its associated Intranet application server 40. The proxies additionally receive appropriate responses back from an Intranet application server 40. Any data returned from the Intranet application server 40 is translated back to client format, and returned over the Internet to the client workstation 10 via the Dispatch Server 26 and at one of the Web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software 16 includes a communications component offering three (3) types of data transport mechanisms: 1) Synchronous; 2) Asynchronous; and 3) Bulk transfer. Synchronous transaction is used for situations in which data will be returned by the back-end server 40 quickly. Thus, a single TCP connection will be made and kept open until the full response has been retrieved.

Asynchronous transaction is supported generally for situations in which there may be a long delay in back-end server 40 response. Specifically, a proxy will accept a request from a customer or client 10 on an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

FIG. 4 also depicts diagrammatically the physical networkMCI Interact network architecture. As shown in FIG. 4, the network is divided into three major architectural divisions including: 1) the customer workstation 10 which includes those mechanisms enabling customer connection to the MCI Web servers located in the DMZ; 2) the Web Servers 24 in the DMZ 17 which is a secure network area set aside on the enterprise premises that is double firewalled at 25(*a*), 25(*b*) between both the public Internet and the enterprise Intranet to prevent potentially hostile customer attacks; and, 3) the MCI Intranet system 30 including the midrange servers 40 and legacy mainframe systems 20(*a*)–(*d*) (also illustrated at 20 in FIG. 1).

The networkMCI Interact customer access mechanisms may include public Internet access, with arrangements made through an Internet service provider.

The DMZ Web servers 24 are found in a special secure network area set aside from the Intranet to prevent potentially hostile customer access. All DMZ equipment is physically isolated and firewalled as illustrated at 25(*a*), 25(*b*) from the company Intranet. Similarly, the DMZ equipment is firewalled and obscured from hostile attacks from the public Internet, except for limited Web browser access to the Web servers which are located in the DMZ. The customer's Web browser connects to a Web server in the DMZ which in turn acts as a proxy to extract select information from midrange servers located in the company Intranet. A customer never directly connects to servers in the company, thus ensuring internal company system security and integrity.

The DMZ acts as a double firewall for company Intranet from the public Internet because the Web servers located in the DMZ never store or compute actual customer sensitive data. The Web servers only put the data into a form suitable for display by the customer's Web browser. Since the DMZ Web servers do not store customer data, there is a much smaller chance of any customer information being jeopardized in case of a security breach.

The Infrastructure component of the NetworkMCI Interact platform includes means for providing secure communications regardless of the data content being communicated. As described in detail co-pending U.S. patent applications SECURE CUSTOMER INTERFACE FOR WEB BASED DATA MANAGEMENT, U.S. Ser. No. 09/159,514 filed Sep. 24, 1998 (Attorney Docket 11043) and SECURE SERVER ARCHITECTURE FOR WEB BASED DATA MANAGEMENT, U.S. Ser. No. 09/159,406 filed Sep. 24, 1998 (Attorney Docket 11051) the contents and disclosures of which are incorporated by reference as if fully set forth herein, the networkMCI Interact security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction. This technique employs public-key cryptography with one-way hashing functions.

To provide the areas of functionality described above, the client tier at workstation 10 is organized into a component architecture, with each component providing one of the areas of functionality. As explained in further detail in co-pending U.S. patent application No. (Attorney Docket 11038), and as illustrated in FIGS. 1 and 4, the client-tier software is organized into a "common object" architecture supporting such objects and applications as the inbox Message Center 77, the Report Requester 76, Service Inquiry 75, Network Manager 74, Alarm Monitor 73, and Traffic Monitor 72. It is understood that these applications are listed for illustrative purposes, among others applications that are available. The functionality of these applications are further enhanced by the adoption of: a CGI program interface to networkMCI Interact that allows HTML and CGI-based systems to access a subset of NetworkMCI Interact middle-tier services. Implementation of these added systems includes the employment of digital signature/client certificates technology and Java objects.

All reporting is provided through a Report Requestor application interface which supports spreadsheet, a variety of graph and chart type, or both simultaneously. For example, the spreadsheet presentation allows for sorting by any arbitrary set of columns. The report viewer may also be launched from the inbox when a report is selected.

By associating each set of report data which is downloaded via the inbox with a small report description object, it is possible to present most reports without report-specific presentation code (the report-specific code is in the construction of the description object). These description objects are referred to as "metadata", or "data about data". At one level, they function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

In the Service Inquiry application of the present invention, the customer workstation 10 is assigned the task of remotely generating a trouble ticket on the MCI Customer Service Management (CSM) system indicated at 20(a) in FIG. 4. The trouble ticket generation process may also be proactively initiated based on detection of a network problem or failure through an event monitor program. For convenience, the general class of network problems, failures and customer inquiries will be hereafter referred to as network events.

As will be described in greater detail below, this generation process will be described with respect to FIG. 2(b) which is a high-level design of the Service Inquiry application and FIG. 5 which is a flow chart illustrative of the process used to open a trouble ticket, and includes the completion of problem classification screen display 300 illustrated in FIG. 6 that describes the detected network event.

Figure 2B:
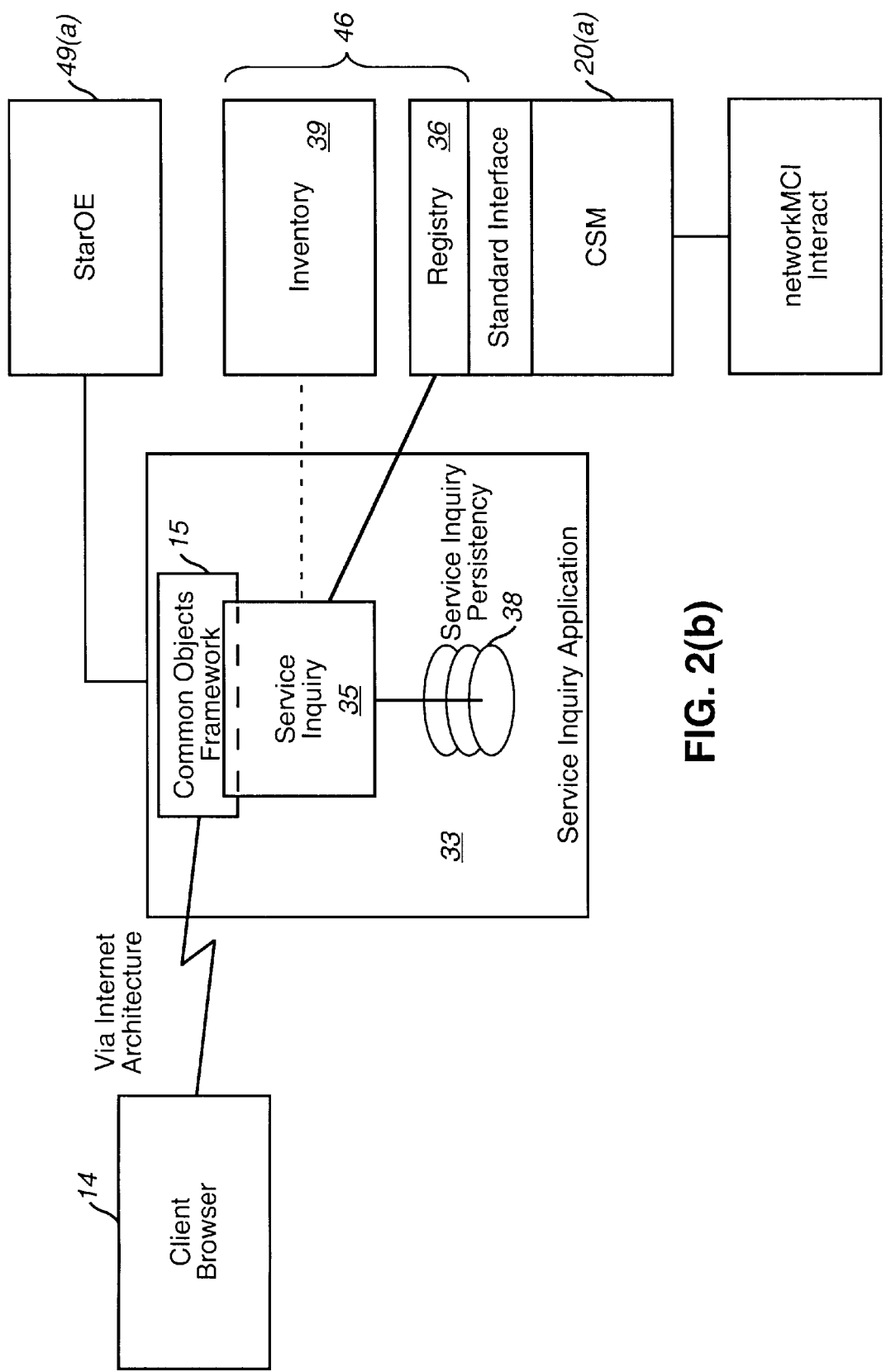
FIG. 2(b) is a high level diagrammatic illustration of the Service Inquiry application of the present invention.

As illustrated in FIG. 2(b), the common object framework 15 is used throughout the enterprise system to enable inter-application communication between most program elements. A Domain Object Model is utilized and is generally illustrated in FIG. 2(b) at 33, and is logically de-coupled from the GUI of the client browser 14. When the client browser 14, resident on the client workstation 10, calls the Service Inquiry application in response to a mouse click by the user at the client work station 10, the CObackplane object 12 first invokes a COuser object to determine the entitlements of the client through a corresponding StarOE object 49(a) resident on the StarOE server 49, as client identification and authentication to the system was earlier determined at the time of Log-In. After a determination of entitlements, the client side of the application, CoApp object 54(a) is downloaded as a Java object as previously described with respect to FIG. 2(a). Alternately, a functionally similar program or script may be downloaded as a Windows CAB file at this time. The CoApp object 54(a) provides a GUI for the client browser, and communicates with the domain object 35, which may or may not be locally downloaded or resident or workstation 10. As selections are made by the user, the Service Inquiry domain 35 will use the Common Object Framework for servicing user calls through CoApp 54(a), as illustrated in FIG. 2(b). The Service Inquiry domain 35 may also download the existing inventory of trouble tickets to which the customer is entitled from the CSM. Service Inquiry object persistency is maintained by heart beat communication between the cookie jar server 32 and the client browser 14 as indicated at 38.

Figure 5:
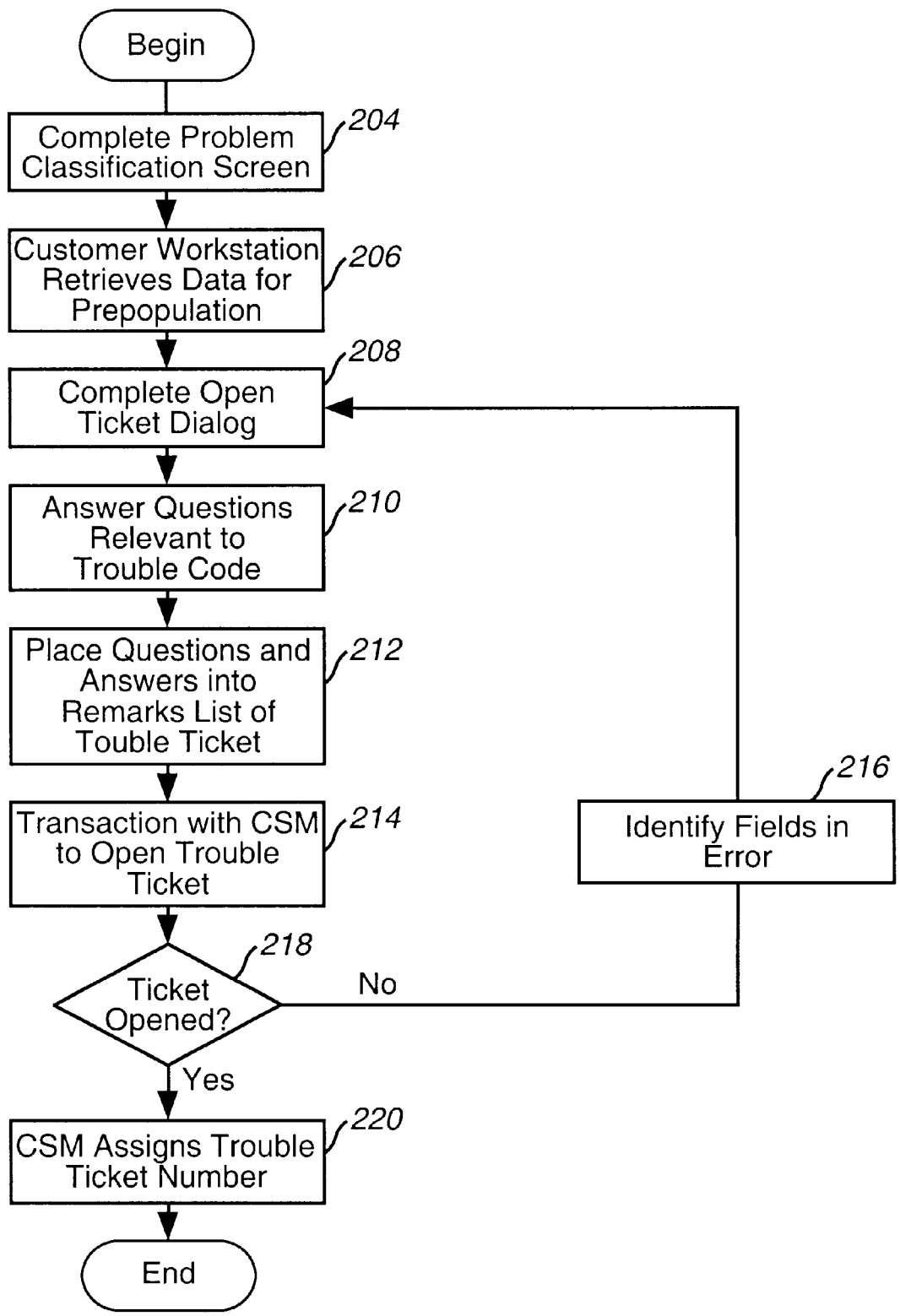
FIG. 5 illustrates a flow chart for remotely opening a trouble ticket under the present invention.
Figure 6:
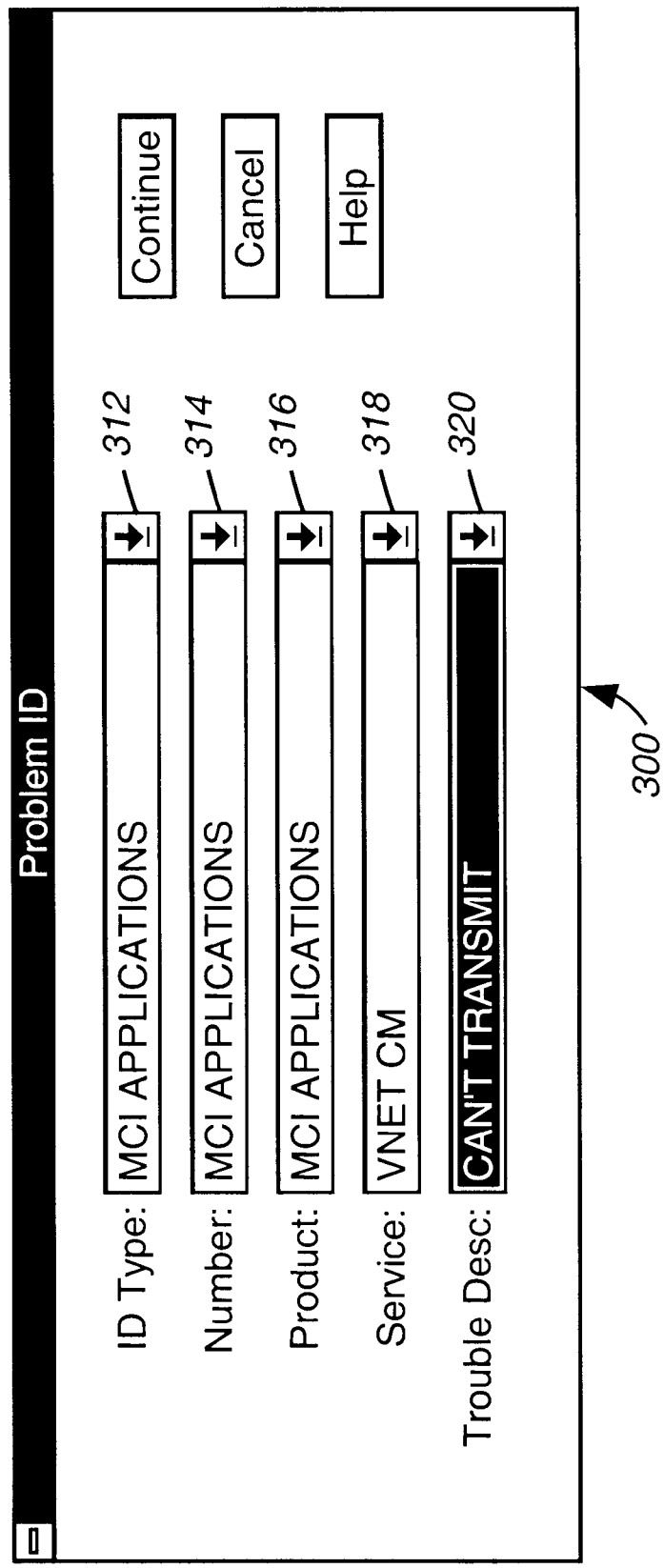

FIG. 5 illustrates a flow chart of the process used to open a trouble ticket. This process includes the completion of problem classification screen display 300 illustrated in FIG. 6 that describes the detected network event.

Figure 7:
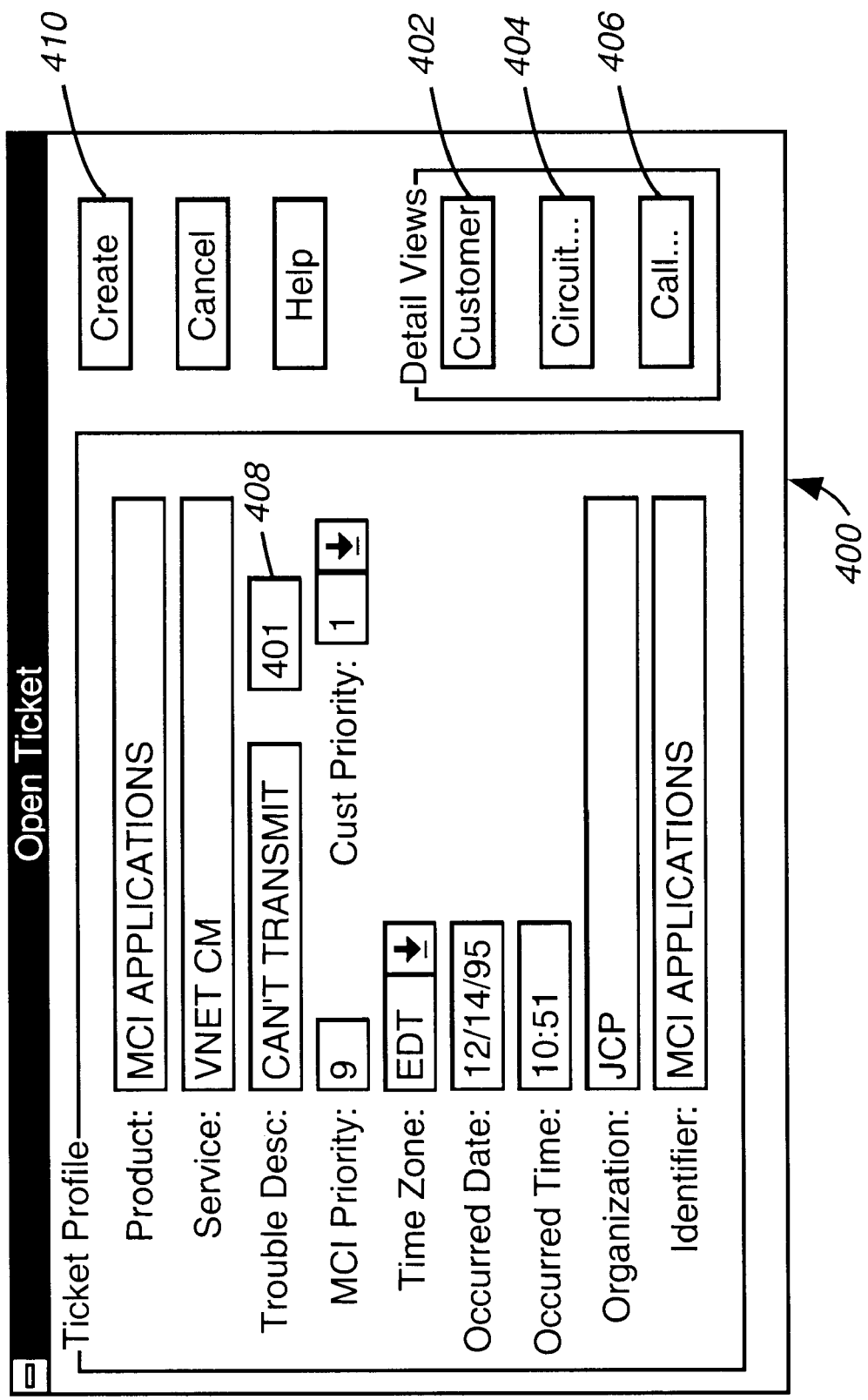
Figure 10:

The completion of the minimum required fields in open ticket screen display 400, illustrated in FIG. 7, the customer details screen display 500, illustrated in FIG. 8, the circuit details screen display 600, illustrated in FIG. 9, and the call details screen display 700, illustrated in FIG. 10. This input process may include information automatically retrieved from a customer profile stored in a database in the Customer Service Management system.

After a trouble ticket is opened, the trouble ticket is displayed in a graphical user interface that displays all trouble tickets associated with the customer's or user's organization. Customer workstation 10 is restricted to the trouble tickets to which customer workstation 10 is privileged by virtue of the authentication procedure previously discussed. The Customer Service Management (CSM) system 20, on the other hand, refers a generated trouble ticket to a service organization that is given responsibility for the resolution of the network event that the trouble ticket describes.

In the "Service Inquiry" system and method for opening and tracking trouble tickets, the trouble tickets are opened in response to a network event (e.g., circuit failure, 800 number failure, alarm, or customer inquiry). These network events may be detected by either the customer or the service provider. If the service provider detects the network event first, an MCI customer service representative immediately opens a trouble ticket by interfacing with the CSM customer service management system.

If the customer detects the network event first, the customer opens a trouble ticket by one of two methods. In a first method, the customer places a call to the MCI customer service representative. During this call, the representative prompts the customer for the relevant information necessary to adequately describe the network event. After the information has been delivered verbally, the customer service representative opens the trouble ticket.

In a second method, the customer opens a trouble ticket by remotely accessing the CSM customer management legacy system 20 using customer workstation 10. This second method is described with reference to the flow chart in FIG. 5 and the Problem 10 screen display shown in FIG. 6. Generally, the interactive process described in FIGS. 5 and 6 minimizes the amount of time it takes for a customer to open a trouble ticket.

Specifically, with reference to FIG. 5, the trouble ticket opening process begins in step 204 where a problem classification dialog or screen display 300 is completed at customer workstation 10. Problem classification dialog 300 sets up the basis for opening a trouble ticket by identifying the network event type. Identifying the network-event type begins by filling in the ID type field. The ID type field classifies the network event (e.g., pertaining to a circuit number or 800 number). The selection is facilitated by a list box, activated by button 312, that includes both options.

Depending upon the value of the ID type field, the customer's list of circuit numbers or 800 numbers will be displayed in a second list box activated by button 314. The selected value is placed in the number field. Next, values for the product field and the service field are selected. Products and their associated services are selected via list boxes activated by buttons 316 and 318, respectively. Generally, a selection of a particular value for the product field will dictate the selections available for the service field. A listing of exemplary products and their associated services is contained in Appendix A.

Finally, a value is selected for the trouble description field. Again, the trouble descriptions available in the list box are dictated by the product and service values previously selected. In one embodiment, the selected trouble description is associated with a trouble code to be stored in the trouble ticket.

In a further embodiment, problem classification dialog 300 is automatically completed based on automatic fault detection at customer workstation 10. In this embodiment, a network event identified by customer workstation 10 automatically invokes problem classification dialog 300 and automatically populates one or more of the ID type field, number field, product field, service field and trouble description field.

In either case, after problem classification dialog 300 is completed, customer workstation 10 retrieves data from a customer profile stored in customer service management system 20. This process is represented by step 206.

Generally, the retrieved customer profile is dedicated to the reporting user/organization. A customer profile can include customer identifying data, customer circuit data, customer employee data or customer contact data. As will be described in more detail below, the data included within the customer profile is used to automatically complete fields (or prepopulate) in the trouble ticket. Prepopulation simplifies the input process by minimizing the amount of input required by the customer in opening a trouble ticket.

In a preferred embodiment, the preparation of a trouble ticket requires the completion of a minimum of data fields within four separate dialogs as shown in FIGS. 7–10 as open ticket dialog 400, customer details dialog 500, circuit details dialog 600 and call details dialog 700. Customer details dialog 500, circuit details dialog 600 and call details dialog 700 are invoked based upon the selection of the corresponding buttons 402, 404 and 406 in open ticket dialog 400.

More specifically, the open ticket dialog or screen display 400 of FIG. 7 comprises general trouble information that was provided with problem ID dialog 300. These fields include the identifier, product, service, and trouble description fields. Associated with the trouble description field is a trouble code field 408.

Customer priority and the service provider priority fields are helpful in establishing an initial service priority for that particular trouble ticket. Customer priority field is optionally designated by the customer. Service provider priority field is prepopulated based on information received from customer service management system 106. During the life cycle of the trouble ticket, one or both of the priority fields can be changed.

Finally, the open ticket dialog 400 of FIG. 7 includes the occurred time and date fields. The occurred time and date fields indicate when the network failure was detected or reported. These fields may be automatically populated when open ticket dialog 400 is invoked if the user at workstation 10 has the appropriate rights to a fault management system.

Generally, a trouble ticket cannot be opened until all required fields within open ticket dialog 400, customer detail dialog 500, circuit detail dialog 600 and call detail dialog 700 are populated. Required fields may be shown in one color (e.g., blue) with optional fields shown in another color (e.g., green). If the customer, circuit and call buttons 402, 404 and 406 display an arrow as illustrated in FIG. 7, this indicates that the corresponding dialogs includes fields that require additional customer input before the trouble ticket can be opened.

The Customer Details dialog 500 of FIG. 8 includes information about the user and/or organization that opened the trouble ticket. Additionally, customer detail dialog 500 includes customer contact information. The Reported By, Primary Contact, Secondary Contact, Customer Name, and GMT access time (representing the company's business hours) fields are prepopulated by using the information included in the customer profile pertaining to the user as stored in the sysA drive server 41.

The Ref In Ticket, Customer Group ID, Report Source and GMT Test Time fields are provided by the customer. Ref In ticket is an optional field that allows the customer to enter an internal tracking number for their own use. The GMT Test Time identifies when a dedicated circuit under control of the customer can be released to the service organization for testing.

The Circuit Details dialog 600 of FIG. 9 includes specific information concerning the circuit in question. Circuit number, product code and service code fields are prepopulated based on the corresponding fields in problem ID dialog 300. Generally, the fields in this dialog are relevant when the customer selects the circuit number option in the ID type field of problem ID dialog 300.

Call Details dialog 700 of FIG. 10, on the other hand, includes fields that are relevant when the customer selects a number option in the ID type field of problem ID dialog 300. Call detail dialog 700 focuses on the inbound and outbound services selected for the trouble ticket.

After the customer provides at least the required information in open ticket dialog 400, customer details dialog 500, circuit details dialog 600 and call details dialog 700, the customer can create the trouble ticket using create button 410 of the open ticket dialog 400 illustrated in FIG. 7. Prior to the actual creation of the trouble ticket, the customer is prompted with questions that are relevant to the trouble code indicated in problem ID dialog 300. In step 210, the customer provides the answers to the questions. These questions will aid the appropriate service organization in diagnosing and correcting the reported network event.

Next, in step 212, the questions and answers pertaining to the trouble code are electronically entered into the remarks list of the trouble ticket. In one example, the questions and answers are transmitted to the CSM customer service management system 20 for storage in a trouble ticket database. The remarks list is a dialog that includes any relevant commentary generated by the customer or an organization that handles the trouble ticket. The questions and the customer's answers entered into the remarks list in step 212 represent the first piece of commentary that will aid the service organization in attempting to resolve the problem. After the trouble ticket is referred to a particular service organization, that organization can also add additional commentary that is readable by the customer as he monitors the trouble ticket activity. Thus, the remarks list provides a convenient historical record of the indirect communication between the customer and the set of service organizations that are assigned to resolve the network event.

Continuing in step 214, customer workstation 102 then enters into an electronic transaction with customer service management system 20 to open the trouble ticket. In this electronic transaction, customer workstation 10 submits the trouble ticket to customer service management system 20 over the public Internet using the networkMCI Interact system previously described. Next, the customer service management system 20 determines whether the information contained in open ticket dialog 400, customer detail dialog 500, circuit detail dialog 600 and call detail dialog 700 is complete. If the customer service management system 20 determines that some of the information required to open the trouble ticket is either invalid or missing, the open ticket dialog 400 of FIG. 7 reappears with arrows on the selections that require completion or correction. This process is represented by step 216. To further aid the customer in correcting the deficiencies, the fields that require correction are highlighted in red.

After the corrections have been made, create button 410 is selected once again and customer workstation 10 initiates another electronic transaction with customer service management system 20 to open the trouble ticket as noted at step 214. If customer service management system 20 determines that the trouble ticket is complete, the trouble ticket is opened and customer service management system 20 assigns a trouble ticket number. The assignment of a trouble ticket number is represented by step 220.

Thereafter, the trouble ticket is immediately displayed in the ticket list 800—illustrated in FIG. 11. The ticket list 800 is a graphical user interface that allows the customer to monitor the activities of all of the trouble ticket associated with his organization. In a preferred embodiment, the customer service management system 20 is polled once every 15 minutes to identify any changes in the trouble tickets displayed in ticket list 800. The customer is also permitted to initiate an update at any point in time.

Prior to describing ticket list 800, it should be noted that a customer's access to trouble tickets is defined by the identification and authentication of the customer at the time of the login by the Order Entry Server. Partitioning of trouble tickets and entitlements within a particular customer may also be done for convenience of the customer. For example, intra-customer partitions may be based upon geographic divisions/locations, retail versus corporate locations, or any other desired internal classification.

The ticket list 800 of FIG. 11 comprises a scrollable table that displays information for a particular trouble ticket in a single row. In the example of FIG. 11, each row includes the following fields: ticket number, organization, status code, status time, customer priority, service provider priority, identifier and trouble code. This listing is not intended to be comprehensive but is intended to provide a high level view of the information contained within a particular trouble ticket.

Each of the status code, status time, customer priority, identifier and trouble code values are identical to their counterparts in the open ticket dialog 400 of FIG. 7. The service provider priority field, on the other hand, is generated by the service organization and indicates the service organization's assessment of the priority of the trouble ticket. Finally, the organization and status code fields provide a tracking feature. In the present invention, tracking of trouble tickets is accomplished through the concept of ownership. When an organization has the responsibility for the ticket, that organization is said to own that trouble ticket. Ownership is described in greater detail with reference to the flow chart of FIG. 12.

Figure 12:
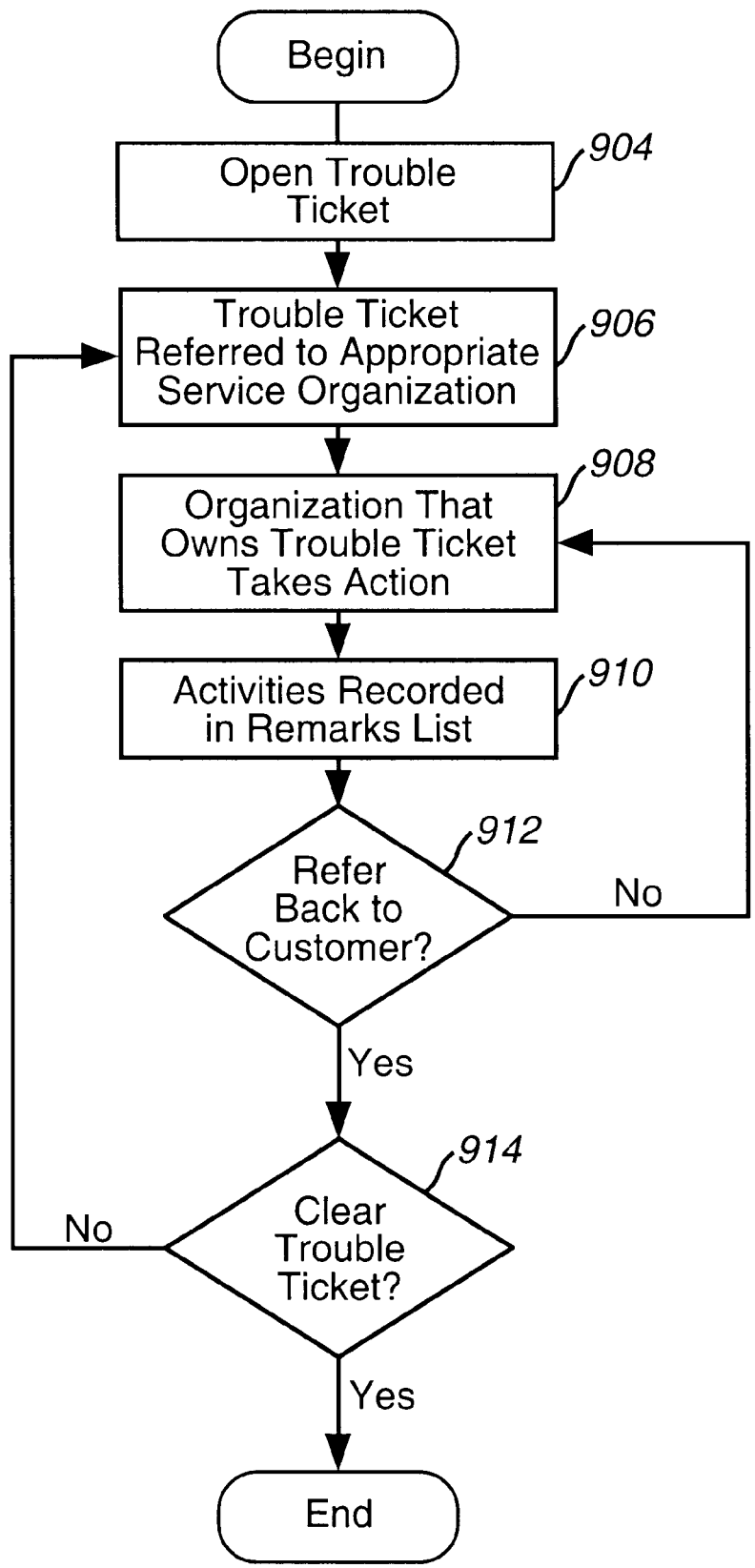
FIG. 12 illustrates a flow chart identifying the process of clearing a trouble ticket.

FIG. 12 describes a high level overview of the process of opening and clearing a trouble ticket. This process begins in step 904 where the originating organization opens a trouble ticket. This process was described above with reference to the flow chart of FIG. 5. After the originating organization opens a trouble ticket, the originating organization is said to own the trouble ticket. Next, in step 906, the originating organization refers the trouble ticket to a first service organization. In step 908, the first service organization takes the appropriate action to attempt to resolve the problem described in the trouble ticket. Contemporaneous with this action, the first service organization's activity is recorded in an activity list associated with the trouble ticket. Additionally, any applicable comments are electronically stored in the remarks list associated with the trouble ticket. These actions are represented by step 910.

At this point, the first service organization (owning organization) determines, in step 912, whether to refer the trouble ticket back to the customer. For example, if the network problem has been resolved, the trouble ticket is referred back to the customer. However, if the owning organization determines that further action is required by a second service organization, then the ticket is transferred to the second service organization. The second service organization now owns the trouble ticket.

In one example, a service organization associated with a long-distance telephone company refers a trouble ticket to a service organization associated with a regional bell operating company (RBOC). Through this interaction, a customer may submit all service inquiries to customer service management system 20 without regard to the location of the network event within the network. This feature further enhances the attractiveness of the trouble ticketing system of the present invention by providing an all inclusive service request contact point. In other words, service requests relating to any service organizations are sent to a single location. Additionally, as noted above and described in Appendix A, service requests for any of a plurality of network products and services are sent to a single location.

Generally, the second service organization follows steps 908 and 910 as described above. After the second service organization completes its service actions, it determines in step 912 whether to refer the ticket back to the first service organization or a third service organization. Steps 908, 910 and 912 are repeated until the trouble ticket is referred back to the customer. At that point in time, the customer determines in step 914 whether to clear the trouble ticket. If the problem described in the trouble ticket has not been suitably resolved, the customer can initiate the entire process again by referring the ticket out in step 906. If the problem has been suitably resolved, the customer clears the trouble ticket.

Tracking the life cycle of the trouble ticket is a valuable monitoring feature for the customer. By identifying the owning organization in the organization field of the ticket list 800, illustrated in FIG. 11, the customer can identify where in the chain of service organizations the trouble ticket currently resides. Moreover, by selecting the activities list in the ticket menu of ticket list dialog 800, the customer is also able to retrieve the summary of the life cycle of the trouble ticket.

An example Activity List is illustrated in FIG. 13. Each row in the table illustrates the movement of the ticket throughout the service network. Specifically, each row includes information concerning the originating organization, the receiving organization, date, time and the relevant activity code. Example activity codes are illustrated in Table 1 below.

TABLE 1

| | |
|---|---|
| ASN | Assign |
| CLT | Cleared Ticket |
| CNR | Cancel Referral |
| CNT | Cancel Ticket |
| ESC | Escalate |
| OPN | Open |
| R B | Referred Back |
| R O | Referred Out |
| RET | Retest Circuit |
| RTN | Return to Cancel, Refer Out |
| STA | Status Update |

By this listing, the customer is informed of the history of the trouble ticket. This history provides immediate feedback to the customer concerning actions taken relative to the current service organization that owns the trouble ticket. Enhancement of trouble ticket monitoring is thereby improved.

Figure 14:
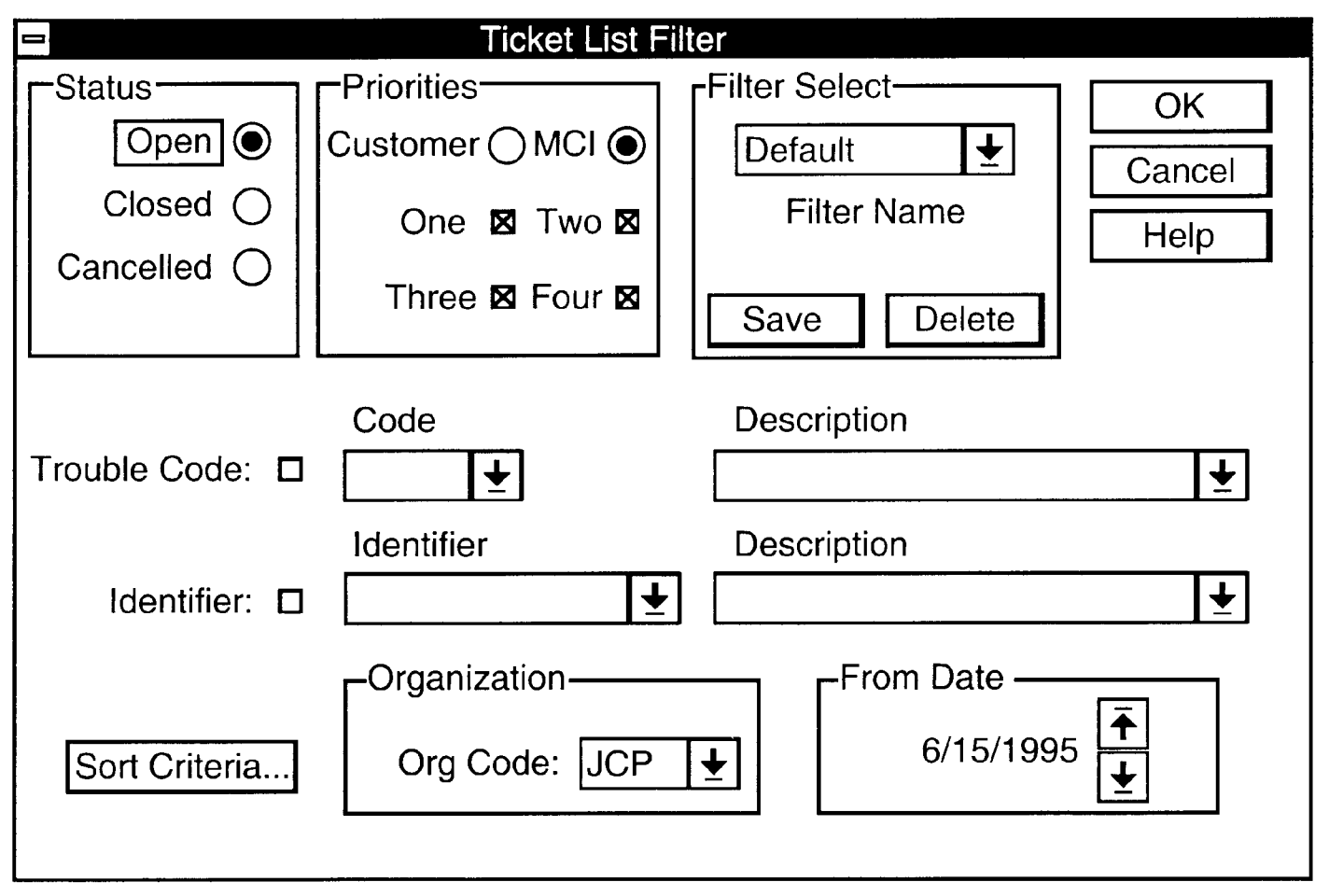

In another feature of the ticket list 800, the customer is also able to both filter and sort the trouble tickets according to ticket list selection dialog 1100 illustrated in FIG. 14. The filtering function allows a customer to selectively display a subset of trouble tickets according to any subset of the fields in ticket list 800. Moreover, through the use of the sort criteria button, the customer is also able to display the trouble tickets in ascending or descending order based on the ticket number, status date/time and priority fields.

To display details concerning a specific trouble ticket, the customer can either double click on a particular row or select the detail item from the ticket menu on ticket list dialog 800. Upon this action, the ticket detail dialog 1200 illustrated in FIG. 15 is invoked. Ticket detail dialog 1200 comprises similar information to Open Ticket dialog 400, including the access to Customer Details dialog 500, Circuit Details dialog 600 and Call Details dialog 700 through the detail views menu. Additionally, Ticket Details dialog 1200 allows the customer to access the remarks list and activities list using remarks button 1202 and activities button 1204, respectively.

While the invention has been particularly shown and described with reference to preferred embodiments thereof, it will be understood by those skilled in the relevant art that various changes in form and details may be made therein without departing from the spirit and scope of the invention.

Appendix A

| PRODUCT | SERVICE |
|---|---|
| VNET | Switched International Inbound |
| | Switched International Outbound |
| | Switched Domestic |
| | Dedicated International Inbound |
| | Dedicated International Outbound |
| | Dedicated Domestic |
| | Card International Inbound |
| | Card International Outbound |
| | Card Foreign |
| | Card Domestic |
| | CM |
| Dial-One | Feature Group D Domestic |
| | Feature Group D International Inbound |
| | Feature Group D International Outbound |
| | Prism Plus Domestic |

-continued

Appendix A

| PRODUCT | SERVICE |
|---|---|
| | Prism Plus International Inbound |
| | Prism Plus International Outbound |
| | Prism III Domestic |
| | Prism III International Inbound |
| | Prism III International Outbound |
| | Calling Card Domestic |
| | Calling Card International Inbound |
| | Calling Card International Outbound |
| Hardwire | Prism I Domestic |
| | Prism I International Inbound |
| | Prism I International Outbound |
| | Prism II Domestic |
| | Prism II International Inbound |
| | Prism II International Outbound |
| | Prism III Domestic |
| | Prism III International Inbound |
| | Prism III International Outbound |
| | Hotel WATS Domestic |
| | Hotel WATS International Inbound |
| | Hotel WATS International Outbound |
| | University WATS Domestic |
| | University WATS International Inbound |
| | University WATS International Outbound |
| | MCI WATS Domestic |
| | MCI WATS International Inbound |
| | MCI WATs International Outbound |
| Private Line (VGPL) | FX |
| | OPX Domestic |
| | OPX International |
| | ARD Domestic |
| | ARD International |
| | TIELINE Domestic |
| | TIELINE International Inbound |
| | TIELINE International Outbound 800 |
| | Dedicated Termination (I) Domestic |
| | Dedicated Termination (I) International Inbound |
| | Dedicated Termination (I) International Outbound |
| | Switched Termination (II & III) Domestic |
| | Switched Termination (II & III) International Inbound |
| | Switched Termination (II & III) International Outbound |
| | Alternate Routing |
| | EVS Domestic |
| | EVS International Inbound |
| | EVS International Outbound |
| | CM |
| | Remote VNET Access Domestic |
| | Remote VNET Access International Inbound |
| | Remote VNET Access International Outbound |
| NW Mgmt Applications Data | NIMS (Cust App/N) |
| | MCI View (Cust App/N) |
| | DDS Domestic |
| | DDS International |
| | TDS Domestic |
| | TDS International |
| | TDS Cross Border |
| | Analog Domestic |
| | Analog International |
| | Switched 56 Dedicated Access Domestic |
| | Switched 56 Dedicated Access International Inbound |
| | Switched 56 Dedicated Access International Outbound |
| | Switched 56 Dedicated Access Domestic |
| | Switched 56 Switched Access International Inbound |
| | Switched 56 Switched Access International Outbound |
| | VPDS 1.0 |

-continued

Appendix A

| PRODUCT | SERVICE |
|---------|---------|
| | HYPERSTREAM Domestic |
| | HYPERSTREAM International |
| | DRS - Circuit Problem |
| | DRS - Software Problem |

What is claimed is:

1. A system for enabling an Internet enabled customer to generate a trouble ticket which relates to a service provided by an enterprise to said customer, said system comprising:

(a) an Internet enabled customer work station to enable IP communication between said customer and a network of said enterprise;

(b) means for authenticating said customer as having trouble ticket entitlement within said enterprise;

(c) a customer service management system for generating and tracking trouble tickets, said system having at least one database for identifying said customer and trouble ticket entitlement for said customer, each of said trouble tickets having multiple data fields;

(d) means for downloading a trouble ticket to said customer work station in response to a customer request, said system prepopulating at least one field of said trouble ticket with data from said database at the time the trouble ticket is downloaded;

(e) means for assigning a ticket identifier to each trouble ticket submitted by said customer;

(f) said management system enabling independent customer and enterprise tracking of said trouble tickets prior to resolution.

2. The system as claimed in claim 1, wherein said customer workstation may populate a problem clarification field identifying a network event at the time a trouble ticket is downloaded.

3. The system as claimed in claim 1, wherein said management system enables the enterprise to populate a problem clarification field identifying a network event at the time a trouble ticket is created.

4. The system as claimed in claim 1 wherein said customer work station includes a Web browser for communicating with said enterprise and said customer service management system.

5. The system as claimed in claim 4 wherein said Web browser enables a frame defined display of data from said data base, said data including a table defining a plurality of rows and columns, with each row displaying predefined fields of a single trouble ticket.

6. The system as claimed in claim 5, wherein said fields include at least said ticket identifier, an activity code which indicates the status of the trouble ticket, and an organization field that indicates a service provider having jurisdiction of said network event represented by said trouble ticket.

7. The system as claimed in claim 6, wherein said table is scrollable within said frame, and includes a link to a remarks field for display of extended remarks.

8. The system as claimed in claim 4, wherein said IP communications includes java data downloaded from an enterprise Web server.

9. The system as claimed in claim 8 wherein said customer tracking of said trouble tickets display is enabled by a common object downloaded from said Web server.

10. A method of remotely generating a trouble ticket for a network event at a customer workstation over the Internet, wherein the event relates to a service provided by an enterprise to the customer, said method comprising:

(a) creating at least one customer record relating to a service provided to the customer by the enterprise in a customer service management system, said record including customer entitlement with respect to the service;

(b) enabling Internet access to said customer service management system by said customer;

(c) authenticating said customer entitlement at the time of customer access of said management system;

(d) downloading a trouble ticket to said customer work station over the Internet in response to a customer request, said trouble ticket having multiple data fields;

(e) prepopulating at least one field of said trouble ticket with data from said customer record at the time said ticket is downloaded;

(f) enabling at least partial completion of said trouble ticket at said customer workstation by populating a problem classification field at said customer workstation prior to a transmission of said trouble ticket to said management system; and (g) assigning a ticket identifier to said trouble ticket when said trouble ticket is received by said management system.

11. The method of remotely generating a trouble ticket for a network event at a customer workstation over the Internet as claimed in claim 10 wherein the step of populating a problem classification field at said customer workstation is in response to a network event identified at said customer workstation.

12. The method of remotely generating a trouble ticket for a network event at a customer workstation over the Internet as claimed in claim 10 wherein the step of populating a problem classification field is conducted by the enterprise in response to a network event identified at said customer workstation.

13. The method of remotely generating a trouble ticket for a network event at a customer workstation over the Internet as claimed in claim 10 wherein the step of enabling Internet access further includes the step of downloading data files to a browser on said customer workstation at the time of access.

14. The method of remotely generating a trouble ticket for a network event at a customer workstation over the Internet as claimed in claim 13, wherein said downloading step further includes the step of downloading an application object which creates a browser frame for display of said data.

15. The method of remotely generating a trouble ticket for a network event at a customer workstation over the Internet as claimed in claim 14, wherein said downloading step further includes the downloading of data in a table view, said table view having a plurality of rows and columns, with each row defining predetermined fields from a trouble ticket to enable a customer to monitor a plurality of trouble tickets.

16. The method of remotely generating a trouble ticket for a network event at a customer workstation over the Internet as claimed in claim 15 wherein said downloading step further includes downloading data fields which include at least said ticket identifier, an activity code which indicates the status of the trouble ticket, and an organization field that indicates a service provider having jurisdiction of said network event represented by said trouble ticket.

17. The method of remotely generating a trouble ticket for a network event at a customer workstation over the Internet as claimed in claim 16 wherein said table is scrollable within said frame, and includes a link to a remarks field for display of extended remarks.

18. The method of remotely generating a trouble ticket for a network event at a customer workstation over the Internet as claimed in claim 10, wherein said downloading step occurs automatically from an enterprise Web server in response to a customer request.

19. The method of remotely generating a trouble ticket for a network event at a customer workstation over the Internet as claimed in claim 18, wherein said Web server downloads a plurality of common objects to a Web browser on said customer work station in response to a customer inquiry.

20. The method of remotely generating a trouble ticket for a network event at a customer workstation over the Internet as claimed in claim 19 wherein one or more of said objects downloaded from said Web server enables a graphical display of data from one or more trouble tickets.

\* \* \* \* \*